Dec. 1, 1936.  E. H. PETERS  2,062,794
CONTAINER FOR FRUIT OR THE LIKE
Filed Sept. 15, 1934
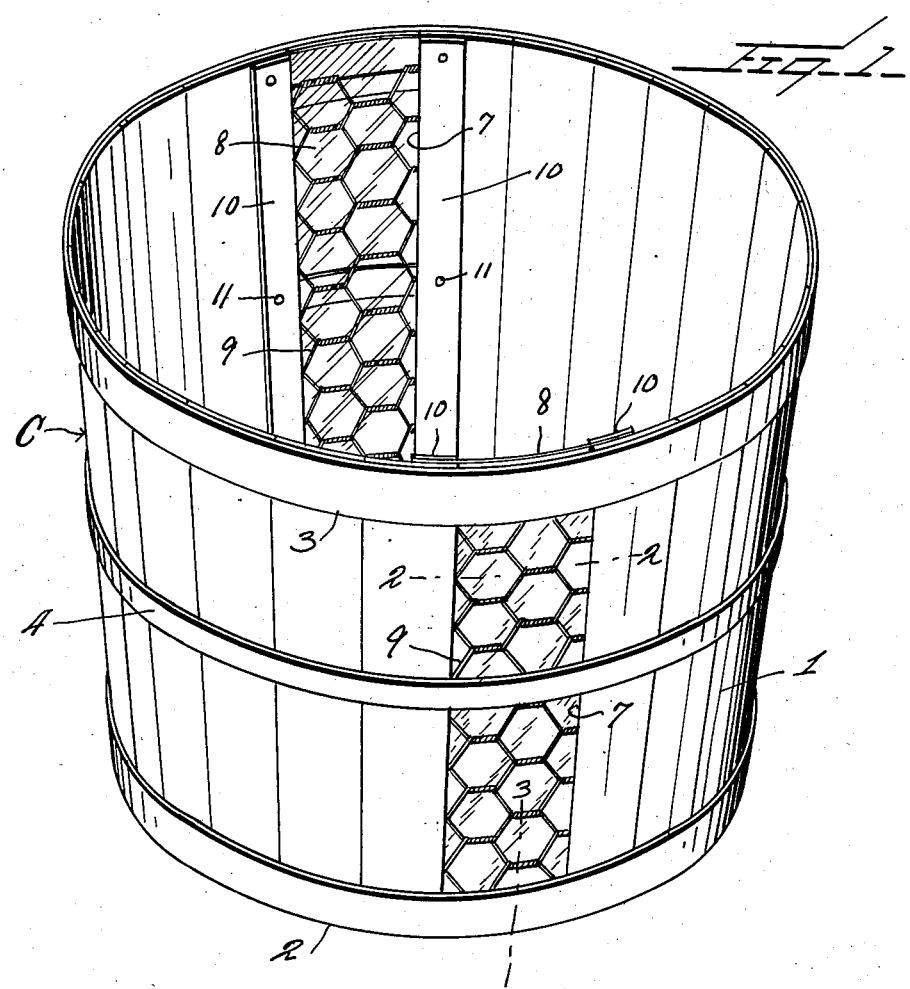
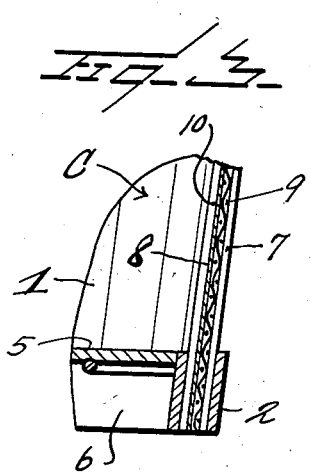
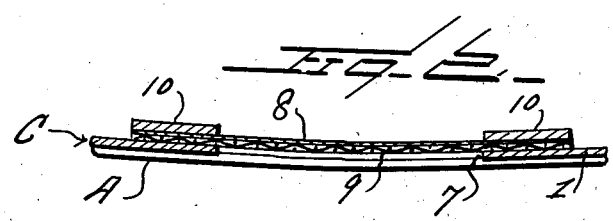
Inventor
E. H. Peters
By Watson E. Coleman
Attorney

UNITED STATES PATENT OFFICE 2,062,794

CONTAINER FOR FRUIT OR THE LIKE

Eugene H. Peters, Benton Harbor, Mich.

Application September 15, 1934, Serial No. 744,208

2 Claims. (Cl. 206—44)

This invention relates to a container for fruit or the like, and it is primarily an object of the invention to provide the side wall of the container at one or more places with openings extending from substantially the bottom to substantially the top of the container to provide means to permit visual access to the content of the container.

Furthermore, it is an object of the invention to provide a container of this kind wherein an opening is provided in its side wall of a material width and wherein is disposed over said opening a lamination of transparent material having a reinforcing medium associated therewith.

Another object of the invention is to provide a container having one or more windows in its side to provide means whereby the contents, or "pack" as in fruit, may be readily seen from the top to the bottom of the container without removing the content or pack or otherwise deranging the same and thus eliminating the so-called "snide pack" which is known to the trade as a pack having good fruit on top and poor in the bottom portion.

The invention consists in the details of construction and in the combination and arrangement of the several parts of my improved container for fruit or the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective of a container constructed in accordance with an embodiment of my invention;

Figure 2 is an enlarged fragmentary sectional view taken substantially on the line 2—2 of Figure 1.

Figure 3 is an enlarged fragmentary sectional view taken substantially on the line 3—3 of Figure 1.

As disclosed in the accompanying drawing, C denotes a container of a type now generally employed in connection with fruit and wherein the staves 1 comprised in the side wall structure are maintained in assembled relation by the bottom hoop 2, the upper hoop 3, and the intermediate hoop 4. As particularly illustrated in Figure 3, the bottom hoop 2 surrounds and coacts with the bottom 5 of the container or more particularly a marginal flange 6 depending therefrom.

At desired points and preferably diametrically opposed, staves are omitted to provide materially wide window openings 7 extending from the bottom 5 to the top or open end of the container, and disposed over each of the openings 7 from within the container C is a lamination 8 of transparent material, such as Cellophane, and also disposed over each of the openings 7 and overlying the outer face of the associated lamination 8 is a metal netted fabric 9, the meshes of which are relatively large. The associated lamination 8 and fabric 9 provide a transparent stave. The side marginal portions of the lamination 8 and the fabric 9 overlie the marginal portions of the side wall of the container C immediately adjacent to the opening 7 and disposed over said overlying portions are the retaining strips 10 nailed, as at 11, or otherwise effectively secured to the side wall of the container. The lower end portions of the lamination 8 and the fabric 9 also overlie the peripheral edge of the bottom 5 or the depending flange 6 and are clamped in place by the applied bottom hoop 2. The upper marginal portions of the lamination 8 and fabric 9 overlie the portion of the top hoop 3 bridging the opening 7.

The transparent laminations 8 permit ready visual access within the container whereby the purchaser may readily inspect the content or pack from top to bottom to protect himself against a "snide" pack and the fabric 9 is sufficiently rigid or stiff to protect the lamination 8 against breakage as a result of the outward pressure of the content within the container.

The strips 10 in addition to providing means for effectively holding the lamination 8 and associated fabric 9 in place serve as a guard medium for such lamination and fabric when containers are nested as in transportation when empty.

It is also believed to be apparent from the foregoing that each of the laminations 8 as disclosed in the accompanying drawing protects the fruit or other content of the container or basket from injury as a result of direct contact with the fabric 9.

It is also to be stated at this time that should it be found preferably to provide the side wall of the basket or other container with four or more window openings 7, a single sheet of Cellophane or other desired transparent material and also a single sheet of fabric 9 may be disposed entirely around the container or basket against the inner face of the side wall. As this, however, is believed to be an obvious arrangement and particularly for economy in production it is not thought necessary that an illustration of this arrangement be made.

From the foregoing description it is thought to be obvious that a container for fruit or the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A basket for fruit and the like comprising a side wall structure including staves, hoops for maintaining the staves in assembled relation, said side wall having certain of the staves omitted to provide a materially wide window opening in said side wall extending from substantially the bottom to the top of the basket, a transparent lamination disposed over said window opening, a second lamination of netted fabric disposed over the transparent lamination to protect said transparent lamination against pressure of the content within the basket, said transparent lamination and said netted lamination being within the basket and having side marginal portions overlying the staves of the basket immediately adjacent to the window opening, and strips disposed over said overlying portions of the laminations and secured to the side wall of the basket to hold the laminations in place and also to protect the laminations when the basket has another basket nested therein.

2. A basket for fruit and the like comprising a side wall having an opening extending from substantially the bottom to the top of the basket, a reinforced transparent stave closing said opening, said stave being within the basket and having side marginal portions overlying the wall of the basket adjacent to the opening, and strips disposed over said overlying portions of the stave and secured to the side wall of the basket to hold the stave in place and also to protect the stave when the basket has another basket nested therein.

EUGENE H. PETERS.